United States Patent [19]

Leonard

[11] 3,980,859
[45] Sept. 14, 1976

[54] CORED WIRE JUNCTION
[75] Inventor: Joseph Charles Leonard, Huntington, W. Va.
[73] Assignee: Huntington Alloys, Inc., Huntington, W. Va.
[22] Filed: Aug. 22, 1975
[21] Appl. No.: 607,066

Related U.S. Application Data
[63] Continuation-in-part of Ser. No. 472,543, May 23, 1974, abandoned.

[52] U.S. Cl. ................................ 219/104; 219/57; 219/58; 219/145
[51] Int. Cl.² .................. B23K 11/02; B23K 35/40
[58] Field of Search ............... 219/57, 58, 94, 104, 219/106, 145, 146

[56] References Cited
UNITED STATES PATENTS

| | | |
|---|---|---|
| 1,363,355 | 12/1920 | Sander ........................... 219/106 X |
| 1,661,303 | 3/1928 | Price et al ...................... 219/145 X |
| 2,039,167 | 4/1936 | Hopkins ......................... 219/145 X |
| 2,579,117 | 12/1951 | Kremer ............................. 219/57 X |
| 3,296,414 | 1/1967 | Holloway et al. .................. 219/146 |
| 3,400,206 | 9/1968 | Barth ............................. 219/145 X |
| 3,496,326 | 2/1970 | Melloy et al. .................... 219/10 X |
| 3,633,063 | 1/1972 | Ando ............................. 219/145 X |
| 3,778,588 | 12/1973 | Bishel ............................... 219/146 |

Primary Examiner—J. V. Truhe
Assistant Examiner—N. D. Herkamp
Attorney, Agent, or Firm—George N. Ziegler; Ewan C. MacQueen; Raymond J. Kenny

[57] ABSTRACT

Ductile junction of metal-sheathed composite wire, such as flux-cored welding wire for use in automatic arc welding machines, is provided by process comprising resistance upset welding.

10 Claims, 7 Drawing Figures

CORED WIRE JUNCTION

This application is a continuation-in-part of U.S. application Ser. No. 472,543, filed May 23, 1974, abandoned.

The present invention relates to welding and more particularly to the junction welding of thin-walled wire-like tubular composite products having a ductile metal exterior around a flexible core of dielectric material, such as flux-cored welding wire.

Production and use of cored wire products comprising a thin sheath of ductile metal around a flexible core of a dielectric material are well known. In the automatic welding art, cored wires having thin, e.g., 0.008 or 0.030 inch thick, sheaths of ductile weldable metal around cores of welding flux, with or without metal powders, are used as consumable welding electrodes in automatic coil-fed arc welding machines. For instance, for use in automatically fed arc welding of cast iron, cored wire electrodes having a nickle/iron alloy sheath around a core of pulverized metals and non-metallics are described in U.S. Pat. No. 3,778,588. It is often desirable, and practically necessary, to join an end of one length of cored wire to an end of another length of the same kind of wire and, for automatic welding, it is specially important to produce a cored wire joint that can be fed at full production speed through automatic welding equipment and thus enable continuous high quality, high speed, welding without interruption or detriment to the weld. End-to-end joining is important for building up required weights of cored wire on spools, sometimes specified by purchasers or necessitated by welding machine design, and helps overcome problems of providing standard weights of spooled wire when the weights of wire coils received from the forming mill vary and is of value for eliminating or reducing scrap losses from short weight or partially used coils. Moreover, end-to-end joining of wire from coils can be beneficial for avoiding production shut-down and rethreading when changing from coil to coil at the spooling station. It is also beneficial to be capable of accomplishing the desired joining with equipment that is practically portable or relocatable to enable joining the wire at the wire spooling station, inasmuch as since the wire is often produced and coiled at a remote mill, the lengths of wire ultimately needed usually do not become evident until a later time when the wire is spooled or used.

The thin-walled tubular products, including cored wire, referred to herein are usually characterized by metal wall thicknesses of about 0.008 inch to about 0.030 inch. The tubular metal sheaths may be seamless tubes or tubes fromed from strip and closed with lap or butt or other seams.

There has now been discovered a method of joining cored wires that provides end-to-end junctions satisfactory for use in autuomatic wire feeding apparatus, particularly including automatic arc welding machines.

An object of the invention is to provide a method for joining thin-walled cored wires.

Another object of the invention is to provide a cored wire junction.

Other objects will become apparent from the following description taken in conjunction with the accompanying drawing wherein.

Figure 1:
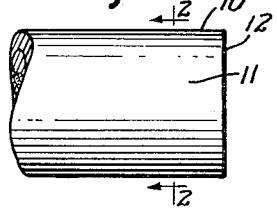
FIG. 1 is a side view of a segment of metal-sheathed flux-cored weld wire having an axial cavity formed by removal of flux according to the process of the invention.

The present invention contemplates a process for joining two ends of metal-sheathed wire which each have a ductile sheath of weldable metal and a flexible core of dielectric material. The process is particularly satisfactory for joining segments of metal-sheathed flux-cored welding wire used in automatically fed arc welding machines. Furthermore, when the process is referred to hereinafter in terms of flux-cored welding wire, it is to be understood that the process can also be applicable to joining the ends of other composite wires having ductile sheaths of weldable metal around flexible cores of dielectric material, e.g., cored brazing wire. In accordance with the process of the invention, perpendicular faces are formed at two ends of metal-sheathed flux-cored welding wire and flux is removed from each of the ends to form two longitudinal cavities, one in each of the two ends. A ductile rider pin composed of essentially the same composition as the sheath metal is inserted into the cavity at one end and positioned to extend into and protrude from the cavity. The second end of wire, with the second cavity, is assembled on the pin with the pin-extending into the second cavity and with the second end face in abutting contact with the face of the first end. Then, the abutment is resistance upset welded and thereafter the upset portion is surface finished to satisfy the diametric tolerance for the weld wire.

In the process of the invention the rider pin is an important requisite for consistently obtaining good results, particularly including sheath-to-sheath metal bonds having strength, ductility, surface smoothness and electrical conductivity characteristics that are satisfactory for operations in automatic feed arc-welding machines. Functions of the pin include aiding in providing and maintaining positive alignment of the wire ends during the resistance upset welding, and replacement of core flux at the sheath bonding location to avoid detrimental interference of the flux with the upset resistance weld and, when the finished joint is in use, the pin aids in supporting and resiliently stiffening the welded junction to enable elastic flexing, and some bending, without fracturing the junction. In the present invention the size of the rider pin is controlled to provide adequate alignment and support and yet avoid excessive rigidity and excessive displacement of flux to achieve success in continuous automatically fed arc welding. For good functioning and promoting good automatic arc welding characteristics to enable continuous, high quality, arc welding without interruption or weld deposit defects while the cored wire electrode junction is fed thru the welding machine and into the weld, it is advantageous to have the length of the rider pin about 5 to about 7 times the outside diameter of the sheath and to have the cross-section diameter of the pin about ½ to about 1 times the inside diameter of the sheath. Generally, it is recommended that the length of the pin should be at least about 2 and not more than 10 times the outside diameter of the sheath.

The controlled composition of the pin provides for compositional uniformity of the arc weld deposit, and the ductile condition ensures against fracture during upset resistance welding and during flexing or bending in use of the wire.

Wedge-shape ends are advantageously provided on the ends of the rider pin to facilitate assembling with the cored wire.

In instances where the interior cross-section of the metal sheath around a cored wire electrode differs from being exactly circular, for instance, where the sheath has been made with a longitudinal lap seam, the inside diameter of the sheath is to be understood herein as being the diameter of the largest circular cross section entirely inside the sheath.

Drilling is recommended for removing core material to form the cavities. The diameters and lengths of the cavities are desirably made a little larger than the diameter and a little longer than one-half the length of the pin and substantially coaxial with the sheath.

It is an advantage for commercial production that the process of the invention does not require working, e.g., cutting, machining or forming to close tolerances, with the following two special exceptions. The end faces of the wire sheath should be prepared uniformly and closely planar and perpendicular (to the length of the wire) to enable providing good electrically conducting contact for resistance upset welding without arcing and to enable maintaining satisfactory alignment of the joint during upsetting. Also, the final finishing of the wire is often governed by purchaser's specifications, which sometimes specify an outside diameter to a tolerance of plus or minus 0.002 inch of the nominal diameter.

The upset weld of the process is a sheath-to-sheath weld. The resulting sheath-to-sheath bond between 0.090-inch diameter segments of nickel/iron alloy-sheathed flux-cored weld wire has shown strength sufficient to sustain dead weight loads of 400 pounds and higher, e.g., increases in load until breaking at about 500 pounds. Such joints that were satisfactorily made according to the process of the invention can be and have been plastically bent around a 6-inch radius without cracking when coiling on 12-inch diameter spools and thereafter have successfully withstood pulling in tension when uncoiling.

Moreover, test specimens of the joint have been plastically bent 180° around a ¾ inch radius without cracking.

The joint is also considered satisfactory for use in welding apparatus that straightens the wire after uncoiling.

For the purpose of giving those skilled in the art a better understanding of the invention, the following illustrative examples are given in conjunction with the accompanying drawing.

EXAMPLE I

Figure 2:
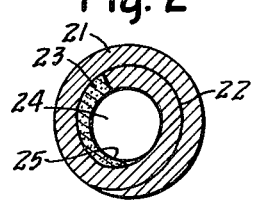
FIG. 2 is a cross-section view of the wire of FIG. 1.
Figure 3:
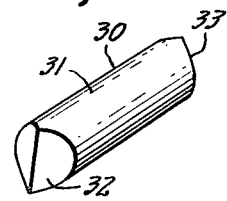
FIG. 3 is a perspective view of a rider pin for the process of the invention.
Figure 4:
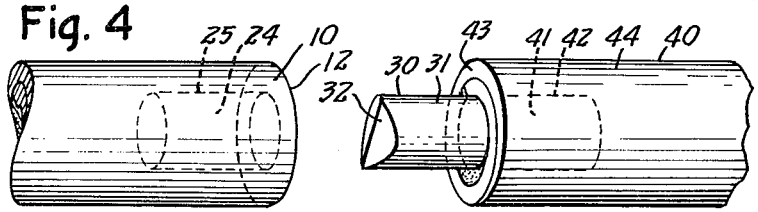
FIG. 4 is a perspective view of the wire segment of FIG. 1 and of a second segment of the same kind of wire which also has an axial cavity formed by removal of flux and, in addition, has the rider pin of FIG. 3 extending into and protruding from the cavity.
Figure 5:
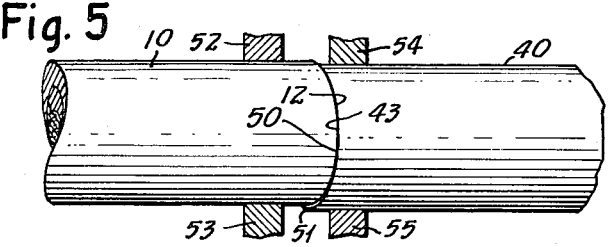
FIG. 5 is a perspective view of the wire segments shown in FIG. 4 when abutted together and held in the jaws (shown in cross section view) of a resistance upset welding machine.
Figure 6:
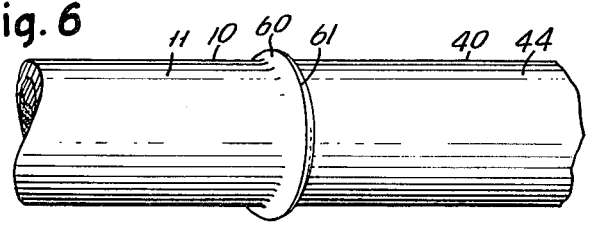
FIG. 6 is a perspective view of the wire segment of FIG. 5 when in the upset welded condition.
Figure 7:
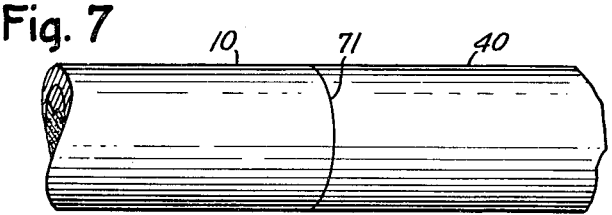
FIG. 7 is a perspective view of the upset junction in the surface finished condition after the segments are joined in accordance with the process of the invention.

Referring now to the drawing, FIG. 1 shows metal-sheathed flux-cored weld wire segment 10 with cylindrical metal outer surface 11 formed by the metal sheath. End face 12 was cut perpendicular to the longitudinal surface using an abrasive wheel. In the present example I, the weld wire has a nominal outside diameter of 0.093 inch. The cross sectional view FIG. 2 shows the cross section of metal sheath 21 closed by lap seam 22 retaining flux core 23. The sheath metal is a ductile, weldable, nickle/iron alloy containing (by weight) about 55% nickel, about 44% iron and small amounts of silicon, manganese and carbon. The flux is a mixture of metal powder and nonmetal powder, e.g., magnesium, graphite and calcium flouride, that is proportioned in combination with the nickle-iron sheath to provide an electrode suitable for arc welding of cast iron, e.g., the welding electrode referred to in U.S. Pat. No. 3,778,588. In the present example I, cylindrical cavity 24 with cavity wall 25 was formed by drilling a longitudinal hole of about ¼ to ⅜-inch length into the flux core with a No. 54 drill (Numbered Twist-drill Size diameter 0.0550 inch). Outside diameter of the weld wire was nominally 0.093 inch, plus-or-minus about 0.002 inch; wall thickness of the sheath (where without lap) was about 0.013 inch; and inside diameter of the sheath, was about .062 inch. Rider pin 30 (FIG. 3) having cylindrical outer surface 31 was prepared by cutting a 0.045-inch diameter nickle-iron alloy wire, which was of the nominal composition of the sheath metal and in the as drawn (one-half to full hard) condition, to a length of about ⅝ inch with a pincerjaw wire cutter to form wedge end faces 32 and 33. Second segment 40 (FIG. 4), which was of the same kind (nominally same flux, sheath metal, diameter) of weld wire as segment 10, was cut by an abrasive wheel to form end face 43 perpendicularly across cylindrical metal outer surface 44. Cavity 41 with wall 42 was drilled to a length of about ¼ to ⅜ inch with a No. 54 drill. The rider pin was placed in cavity 42 with hand pressure to obtain a friction fit holding the pin protruding from the cavity. Segments 10 and 40 were assembled with the pin extending into cavity 24 and with end faces 12 and 43 in abutting contact at abutment 50, as illustrated in FIG. 5. It is noted that the process has tolerance for a small uneven step e.g., about ½ the sheath wall thickness, at the abutment, depicted at 51. The sheaths were clamped in jaws 52 and 53 and jaws 54 and 55 of a resistance upset welder (Taylor-Winfield micro model J4S) and the abutment was resistance upset welded, with current conducted thru the abutment while compression was applied, thereby producing upset protrusion 60 and resistance weld 61. The upset protrusion was removed by grinding, and the process of example I resulted in welded junction 71 which had satisfactory characteristics of strength, ductility, smoothness and composition sufficient for automatic machine-fed arc welding of cast iron. Success was confirmed with satisfactory results obtained by employing the joined portions as a coil-fed electrode for welding cast iron with a MC-750 Hobart CP welding machine having a SA-Hobart Automatic Wire Feeder and a Linde Oscillator.

EXAMPLE II

In another example, two segments of the same kind of nickle/iron alloy-sheathed, flux-cored weld wire were prepared by squaring the ends and drilling longitudinal cavities therein with a 0.062-inch diameter drill. Lengths of the cavities were each about ¼ inch. The segments were assembled with a rider pin which had a metal composition essentially the same as the sheath metal and which had the configuration depicted in FIG. 3 with a diameter of 0.062 inch and a length of about ⅝ inch. The drill diameter of 0.062 inch was sufficiently great to remove the flux core across the inside diameters of the sheaths, and, thus, greater support between the pin and sheaths was obtained when the wire segments and pin were assembled. The finger tight (hand fittable) pin-to-sheath fit was advantageous for good alignment during upsetting and yet enabled sheath-to-sheath conduction of electric current and sheath movement on the rider pin sufficiently for successful sheath-to-sheath resistance upset welding. The sheaths were assembled in abutting contact over the pin and were resistance upset welded in a micro precision butt welder as described for example I. Then the upset protrusion was removed by grinding to a diameter tolerence of 0.002 inch. Inspection and use of cored wire junctions made according to the process example II confirmed that the process provided welded junctions that were satisfactory in operation in automatic machine-fed arc welding apparatus, e.g., the Hobart apparatus employed for welding cast iron as referred to in example I.

Example II with the rider pin diameter equal to the inside diameter of the sheath was particularly advantageous in providing a snug metal-to-metal supporting fit for ensuring consistently good alignment. Example I with the smaller diameter of pin and cavity (about ¾ the I.D. of the sheath) had satisfactory alignment of the sheaths and was particularly advantageous in providing a junction containing flux for ensuring continuous quality of arc welding.

Visual examination of sections cut from junctions made according to the invention showed that the rider pin in the junction of Example I had remained essentially unbonded to, and capable of movement within, the sheaths, whereas the junction of Example II had the pin partially bonded to the sheaths.

The present invention is particularly applicable for end-to-end joining of segments of metal-sheathed flux-cored welding wire for use in mechanically fed arc welding machines, e.g., nickle/iron alloy-sheathed, pulverized flux-cored wire for arc welding cast iron, in order to join coils or spools of wire or to reconnect broken or cut wire. The invention is widely useful for providing junctions of weld wire having lap-seam, butt-seam or seamless sheaths of ductile weldable metals, including nickle, iron, nickle/iron alloys, nickle/iron/chromium alloys, e.g., stainless steel, and nickel/copper alloys around dielectric flux cores. Of course, it is understood herein that the dielectric cores may comprise discontinuous forms of electrically conductive materials, e.g., powdered metals or carbon, in mixtures that are electrically non-conducting in relation to the metal sheaths. In addition to weld wire, the invention is also applicable to providing junctions in other metal-sheathed dielectric cored products such as flux cored brazing wire.

Moreover, when desired, the invention is applicable to joining metal-sheathed dielectric-cored wires of different compositions, provided that the rider pin is made of a metal having characteristics compatible with the sheath metals, for instance, where it is desired to provide a change to a different weld deposit composition without interrupting a machine welding process.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for joining two ends of two segments of composite wire each having a ductile metal sheath around a core of dielectric material comprising;
    a. preparing perpendicular, essentially planar, end faces on two ends of the metal sheaths to be joined;
    b. removing core material from each of the perpendicular faced ends to form two longitudinal cavities at the two ends while maintaining the integrity of the metal sheaths;
    c. inserting into one of the cavities a ductile metal rider pin having a composition compatible with the sheaths and positioning the rider pin to extend within and protrude longitudinally from the cavity;
    d. assembling the second segment onto the rider pin in a junction position having the perpendicular faced ends of the metal sheaths of the segments in mutually abutting contact and having said metal pin extending into both of the cavities in the ends of the sheaths;
    e. resistance upset welding the abutting sheath ends to join the ends of each other; and thereafter
    f. surface finishing the wire at the upset resistance welded portion to provide a uniform diameter along the exterior surface of the joined segments.

2. A process as set forth in claim 1 wherein the perpendicular end faces are prepared by cutting across the wire with an abrasive wheel.

3. A process as set forth in claim 1 wherein the longitudinal cavities are formed by drilling.

4. A process as set forth in claim 1 wherein, prior to insertion of the rider pin into the cavity, wedge-shaped ends are formed on the rider pin.

5. A process as set forth in claim 1 wherein the rider pin is made with a length about 2 to about 10 times the outside diameter of the sheath and with an outside diameter at least about ½ the inside diameter of the sheath.

6. A process as set forth in claim 1 wherein the diameter of the rider pin is about ½ to about ¾ of the inside diameter of the sheath and wherein the rider pin is maintained unbonded to the sheaths and capable of movement inside the sheaths.

7. A process as set forth in claim 1 wherein the rider pin is made with a diameter about equal to the inside diameter of the sheath.

8. A process as set forth in claim 1 wherein the surface finishing is done by grinding.

9. A junction of two segments of metal-sheathed dielectric-cored wire, comprising:
    a. a first segment of cored wire having a sheath made of a ductile weldable metal and a core of dielectric material;
    b. a second segment of cored wire having a sheath made of a ductile weldable metal and a core of dielectric material;
    c. a rider pin enclosed inside the sheaths and extending within each of the sheaths said pin being composed of a ductile weldable metal having a composition that in combination with the sheath metals is compatible for the intended use of the wire; and d. at least a portion of a ductile resistance-upset butt weld circumferentially joining the first sheath to the second sheath and having a surface-finished exterior conforming to the exterior surfaces of the sheaths.

10. A junction as set forth in claim 9 wherein each of the segments are metal-sheathed flux-cored welding wire each having the same nominal composition, wherein the rider pins is of a metal having essentially the same nominal composition as the metal of the sheaths and wherein the metal of the sheaths and of the rider pin is a nickle-base alloy containing at least about 55% by weight nickel.

* * * * *

UNITED STATES PATENT OFFICE
CERTIFICATE OF CORRECTION

PATENT NO. : 3,980,859
DATED : September 14, 1976
INVENTOR(S) : JOSEPH CHARLES LEONARD It is certified that error appears in the above-identified patent and that said Letters Patent are hereby corrected as shown below:

Col. 1, line 54, "fromed" should read --formed--.

Col. 5, line 64, "when" should read --where--.

Col. 6, line 32, claim 1 e), "of" should read --to--.

Signed and Sealed this

Tenth Day of May 1977

[SEAL]

Attest:

RUTH C. MASON
Attesting Officer

C. MARSHALL DANN
Commissioner of Patents and Trademarks